United States Patent Office 3,540,922
Patented Nov. 17, 1970

3,540,922
PROCESS OF FORMING NONPOROUS FERROUS METAL BRIQUETTES AND RESULTING PRODUCT
James W. Brown, Halifax, Nova Scotia, Canada, and Edwin E. Sale, Baton Rouge, La., assignors to Esso Research and Engineering Company, a corporation of Delaware
No Drawing. Filed July 3, 1968, Ser. No. 742,127
Int. Cl. B22f 3/26
U.S. Cl. 117—127     9 Claims

ABSTRACT OF THE DISCLOSURE

The present invention relates to a process for treating porous metal briquettes with slurries of fines of the metal or metal oxide to produce a more dense, inactive briquette. The slurry used in the treatment is acidic, or contains a halide salt, or both. In particular, it relates to a process for treating ferrous metal briquettes, particularly briquettes produced by compaction of particulate reduced iron products from direct iron ore reduction processes. In accordance therewith, briquettes are contacted with slurries of finely divided iron or iron oxides, or both, to clog the surface pores of the briquettes to produce a more dense product which is less susceptible to water pickup, back oxidation, hydrogen evolution, spontaneous ignition and associated characteristics. In the preferred process, hot briquettes are dipped in or sprayed with dense slurries of fines, e.g., by product particulate iron metal and iron oxides, until the briquettes reach a temperature, providing just sufficient residual heat so that the briquettes will spontaneously dry. These novel articles are relatively nonporous due primarily to the surface adsorption of the fines.

---

It is known to form compacts, billets, extrudates, or briquettes from particulate metals, fines, or powders by various compaction techniques utilizing, e.g., extruders, ram-type presses, roll presses and the like. Particulate reduced iron products from direct iron ore reduction process are often compacted in such fashion at temperatures below the melting point of the metal to form relatively porous structures. Such briquettes must be passivated in some fashion to render them less reactive since they are highly susceptible to back oxidation (reoxidation). This is particularly true of briquettes formed from the more highly active forms of metal which are susceptible in certain environmental conditions to water pickup, hydrogen evolution and even spontaneous ignition.

In a typical direct iron ore reduction process, particulate oxidic iron ores, or precurors thereof, are directly reduced, without melting, in rotary kilns, hearth furnaces, sintering machines, traveling grates, or the like. Sometimes ore pellets are formed prior to reduction, but often particulate or very finely divided products are obtained, e.g., as when reduction is carried out by treatment of the ore in a fluidized bed. Products which are too finely divided, in any regard, cannot be directly utilized in many operations and must be briquetted, or compacted.

Typically, particulate metallic iron from a direct iron ore reduction process is withdrawn at from about 1000° F. to about 1800° F., and fed into the nip of a pair of opposing rolls of a briquetting apparatus. The particulate metal product is pressed at pressures ranging generally from about 20,000 pounds per square inch to about 100,000 pounds per square inch, and higher, to form the briquettes. High temperatures are also helpful in the briquetting operation. In essentially any practical operation, the resultant briquette contains considerable internal voids or spaces open to the surface of the briquette by pores, cracks and crevices. Such briquettes are thus quite porous and can be termed "sponge-like" in character. They are capable of absorbing moisture, noxious gases, and various other corrosive agents which hasten reoxidation, thus creating various other problems.

It is the primary object of the present invention to obviate the foregoing and other difficulties. In particular, it is an object to provide a method for reducing the porosity of metal briquettes, especially ferrous metal briquettes such as produced from products of direct iron ore reduction processes. More particularly, it is an object to provide a new and novel process for treating briquettes to produce a more dense, less active and passivated briquette. It is also an object to provide new and improved articles made from such briquettes, particularly by treatment of conventionally porous briquettes with finely divided metals, oxides of such metals, or mixtures of these and other substances which reduces surface porosity.

These and other objects are achieved in accordance with the present invention which comprises a process wherein metal briquettes are treated by contact with acidic or halide salt containing slurries of finely divided metals and oxides of the metal of which the briquette is composed, or both, to produce dense, inactive or less active briquettes. In particular, ferrous metal briquettes, especially briquettes composed of iron from a direct iron ore reduction process, are treated, preferably while hot, with dense slurries of finely divided metallic iron or iron oxides, or both, to produce a dense briquette which is less susceptible to water pickup, back oxidation, hydrogen evolution, spontaneous ignition and associated problems. The slurry is one having an acid pH, one containing a halide salt, or both. By-product fines consisting essentially of finely divided metallic iron, oxides of iron or mixtures thereof are suitable for forming slurries that can be readily applied to the briquettes to reduce surface porosity.

The slurries must contain sufficient amounts of finely divided solids particles for effectiveness. Suitably, from about 1 percent to about 20 percent, and more preferably from about 1 percent to about 5 percent solids, based on the weight of the total slurry system, are used in forming the slurries. For greatest effectiveness, the particle size distribution of the particular metal and metal oxides solids range from about 200 mesh (Tyler Series) to about 5 microns particle size diameter, and finer, and preferably from about 325 mesh to about 5 microns diameter, and finer. The by-product fines from fluidized iron ore reduction processes have been found particularly effective. The finely divided particles are absorbed into the surface pores of the briquette producing a dense product which is not susceptible to water pickup, back oxidation, hydrogen evolution, spontaneous ignition and the like.

It is necessary to use a slurry containing a halide salt, or one having an acid pH, and preferably the slurry is one which is both acidic and one which contains a halide salt. Preferably, the pH of the slurry ranges from about 5 to about 6. More strongly acidic slurries can be used to bring about the desired effect, but the increased acidity produces an acceleration of the reoxidation effect. The detrimental effects of such highly acidic slurries can more than offset the derived advantages and hence are not normally used.

It has been found that the presence, preferably the additional presence, of the halide, e.g., the chloride ion, within the slurry promotes porosity reduction. The use of halogen acids or salts, e.g., hydrochloric acid, or of a chloride salt, e.g., sodium chloride, potassium chloride, ferric chloride, and the like, thus promotes porosity reduction, and lessens the severity of the acid treatment.

Suitably, from about 0.05 to about 3.0 percent, and preferably from about 0.05 to about 0.5 percent, by weight, of the halide is added to the slurry. Ordinary sea water has been found effective in forming slurries.

The reason for the effectiveness of these slurries in reducing the porosity of the briquettes is not known. The fines adhere tightly to or clog the pores at the surfaces of the briquettes, and even become bonded to the surfaces around the pores. Whatever the mechanism, however, the fines plug the pores to reduce the surface porosity of the briquettes, though considerable voids may remain within the interior. The result is to produce a relatively dense, more inactive briquette.

In the preferred process, hot briquettes are dipped in or sprayed with the dense slurries until the briquettes reach a temperature at which they will dry after the operation is completed. Preferably, a briquette ranging from about 1000° F. to about 1800° F., or more preferably from about 400° F. to about 1000° F. is contacted with an aqueous slurry of the fines to reduce the temperature of the briquettes below about 300° F. and preferably down to about 250° F. At these temperatures the briquettes are sufficiently cooled that they will not significantly reoxidize, but yet will possess sufficient residual heat to dry spontaneously.

The following non-limiting example presents selected data which bring out the more salient features and provides a clear understanding of the invention.

EXAMPLE

For each of the following selected runs, briquettes are formed by pressing 1400° F. reduced iron particulate metal (95 percent metallization) from a fluidized iron ore reduction process at about 20,000 pounds per square inch in a roll type press. The briquettes initially have a porosity of 17.3 percent, as measured by water displacement in a vacuum (refer to 1). Porosity is determined by immersing tared briquettes in water, the system being exposed to a pressure of about 5 pounds per square inch. The water pickup provides a relatively accurate measure of the void spaces or porosity of the briquettes. Such measurements are taken before (control only) and after the various treatments described below.

The slurries used for the individual tests are formed by admixing 5 percent, based on the weight of the total slurry, of by-product fines from a fluidized iron ore reduction plant with water. Substantial amounts of the solids fines range below 325 mesh (Tyler Series). Substantially 10 percent of the solids are metallic iron and the balance is iron oxides. Hydrochloric acid and sodium chloride are later added.

Briquettes for the several individual tests are heated in nitrogen to 500° F., and quenched in the media shown below to ambient temperature, washed and then dried in a vacuum oven. The first column describes the type of quench and the second column gives the apparent porosity under test conditions.

| Type of quench: | Apparent porosity |
|---|---|
| (1) Starting material, no reheat or quench (control) | 17.3 |
| (2) Quenched in water only | 14.6 |
| (3) Quenched in fines slurry, pH 8 to 9. No added salt | 17.9 |
| (4) Quenched in fines slurry, pH=3 | 7.7 |
| (5) Quenched in fines slurry containing 1% sodium chloride, pH 8 to 9 | 8.9 |
| (6) Quenched in fines slurry containing 1% sodium chloride, pH=3 | 4.6 |
| (7) Quenched in 1% sodium chloride solution. No fines | 17.5 |

The above tests show that mere treatment with water (2) provides no benefits. The presence of the fines solids is essential. A simple quench with a basic slurry (3), containing no salt, likewise shows no reduction in porosity. With a slurry having an acid pH (4), the porosity is substantially reduced.

The addition of the chloride salt to a non-acidic slurry also promotes porosity reduction (5). Thus, in such test it is shown that the apparent porosity is reduced to 8.9.

Run 6 shows that the presence of both acid and salt together is most effective in reducing porosity.

Though various liquids can be used for the practice of this invention, the cheapness and ready availability of water make it far more suited than other liquids. In acidifying the slurries, halogen acids are preferred, particularly hydrogen chloride. Other commonly available acids suitable for use are sulfuric acid, nitric acid, acetic acid and the like. The natural salts occurring in sea water are quite advantageous, and sea water per se is suitable in formation of slurries.

It will be apparent that the present invention is subject to some modification and variation without departing the spirit and scope of the invention.

Having described the invention, what is claimed is:

1. A process for reducing the porosity of porous ferrous metal briquettes comprising the steps of
   contacting the porous briquette with a liquid slurry containing compounds selected from halogen salts and acids, and finely divided solids consisting essentially of material selected from particulate metallic iron and oxides of iron, and mixtures thereof, the solids contained within the slurry in concentration ranging from about 1 percent to about 20 percent.

2. The process of claim 1 wherein the ferrous iron constituting the briquette is one obtained from a direct iron ore reduction process.

3. The process of claim 2 wherein the ferrous metal is one obtained from a fluidized iron ore reduction process by reduction of oxidic iron ores.

4. The process of claim 1 wherein the briquette is initially heated to a temperature ranging from about 1000° F. to about 1800° F., and the briquette is quenched with the slurry to a temperature of not more than about 300° F.

5. The process of claim 4 wherein the briquette is quenched to a temperature of about 250° F.

6. The process of claim 1 wherein the liquid of the slurry is water, and the slurry is acidic.

7. The process of claim 6 wherein the acidity of the slurry ranges from a pH of about 5 to about 6.

8. The process of claim 7 wherein the slurry also contains a halide salt.

9. As an article of manufacture, a porous ferrous metal briquette formed by the steps of
   contacting the porous briquette with a liquid slurry containing compounds selected from halogen salts and acids, and finely divided solids consisting essentially of material selected from particulate metallic iron and oxides of iron, and mixtures thereof, the solids being contained within the slurry in concentration ranging from about 1 percent to about 20 percent.

References Cited

UNITED STATES PATENTS

| 1,439,907 | 12/1922 | Main | 75—44 |
| 2,239,800 | 4/1941 | Vogt et al. | 117—131 X |
| 2,715,589 | 8/1955 | Smith | 117—131 |
| 2,927,852 | 3/1960 | Bowden | 75—44 X |
| 2,971,865 | 2/1961 | Metcalfe et al. | 117—130 |
| 3,107,166 | 10/1963 | Behr | 75—44 |
| 3,258,361 | 6/1966 | Kahn | 117—127 X |
| 3,264,090 | 8/1966 | Swartz | 75—44 X |
| 3,392,008 | 7/1968 | Wald | 75—44 X |

ALFRED L. LEAVITT, Primary Examiner

J. R. BATTEN, JR., Assistant Examiner

U.S. Cl. X.R.

75—44; 117—131